July 10, 1956
A. D. SHOEMAKER
2,753,630
TREE PRUNERS
Filed Sept. 20, 1954
2 Sheets-Sheet 1
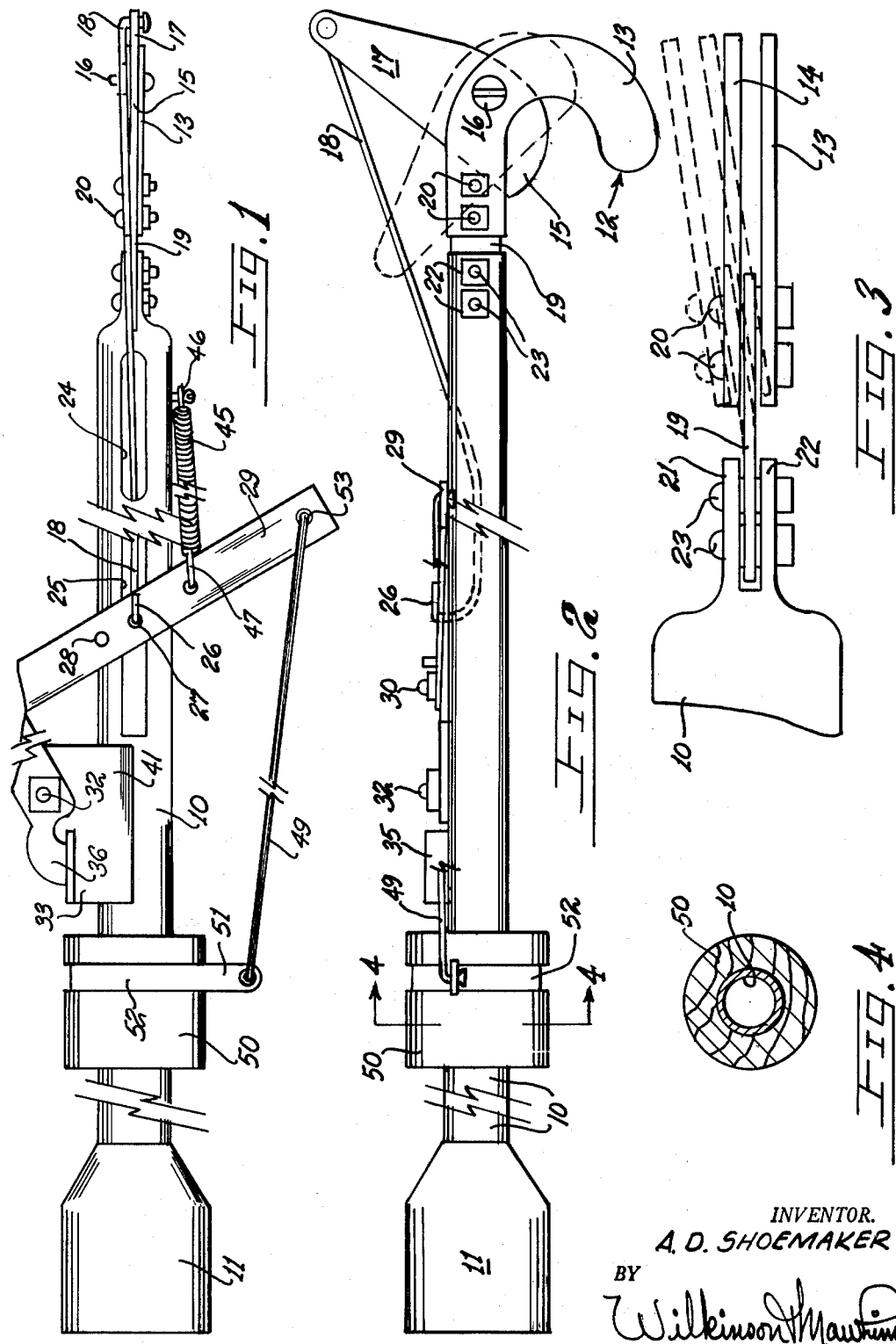
INVENTOR.
A. D. SHOEMAKER
BY
Wilkinson Mawhinney
Attorneys

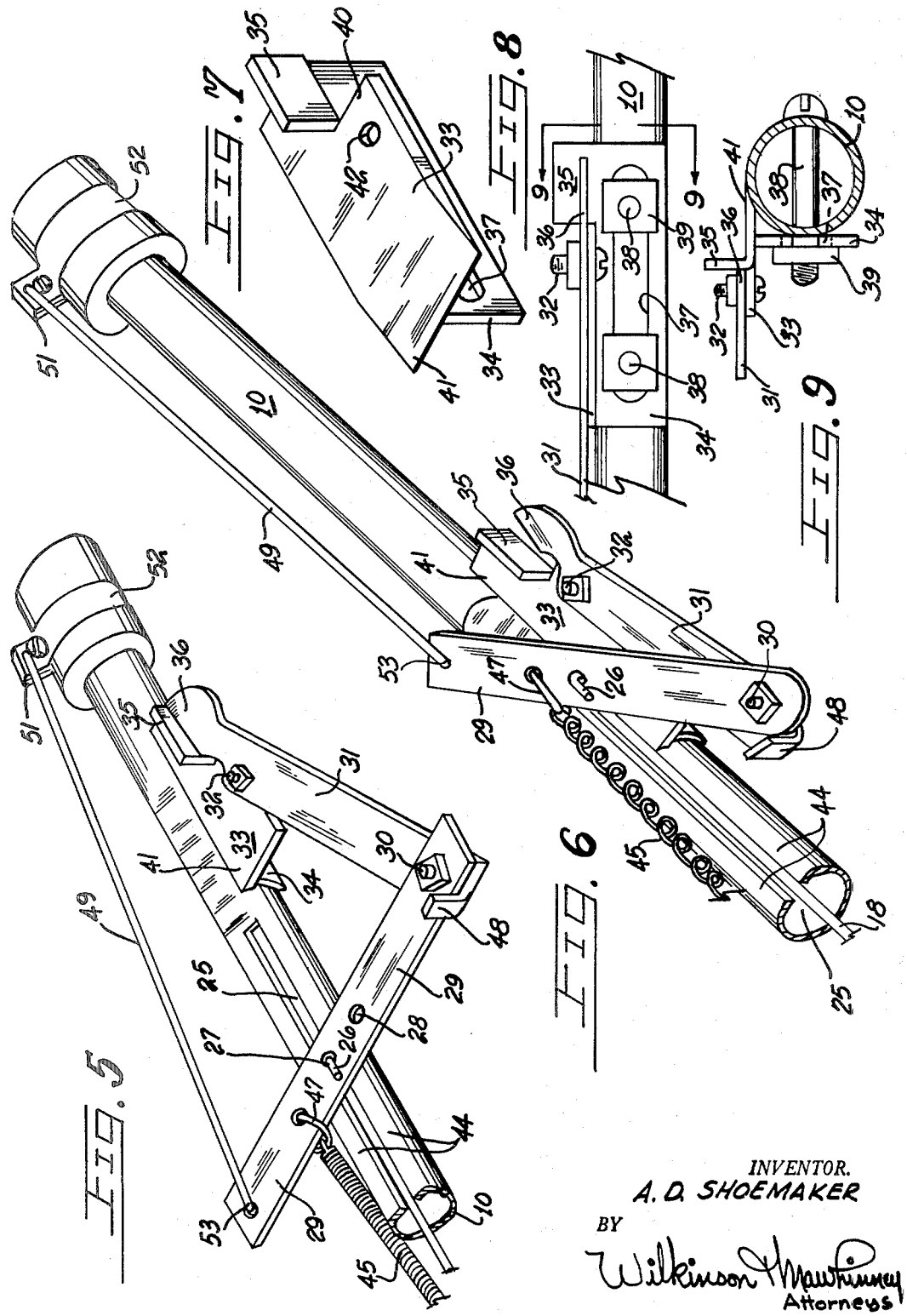

United States Patent Office 2,753,630
Patented July 10, 1956

2,753,630

TREE PRUNERS

Austin D. Shoemaker, Yakima, Wash.

Application September 20, 1954, Serial No. 456,898

2 Claims. (Cl. 30—249)

The present invention relates to tree pruners and has for an object an improved operating mechanism for the shear or cutting blade by which increased leverage may be applied to cut larger or thicker branches of the tree.

Another object of the invention is to provide an improved operating mechanism involving a relative rearrangement of the parts to prevent binding of the movable parts at the joints thereof, which is a common weakness of conventional pruners in use at the present time.

Another object of the invention is to provide an improved tree pruner in which the head comprising the hook and the shear blade are mounted to the top of the pole by a flat resilient metal insert which permits the head to be flexed from side to side of the pole whereby such head may be moved into cramped quarters on the branch or may be made to assume various lateral positions angular to the pole due to various conformations encountered in tree branches, such arrangement causing the knife or blade to bend with the hook so that the blade will cut evenly at all times and will not bind in the hook or strike the side plates of the hook which would dull the knife. This arrangement assures a sharp blade all day which means better and more work in the day.

A further object of the invention is to provide an adjustable bracket arrangement on the pole which carries the operating lever to which the pull wire from the knife or blade is attached, the adjustment of the bracket along the pole being useful where the pull wire becomes broken and thus necessarily shortened, in which event the adjustable bracket may be advanced to a new position along the pole to permit a new hook to be bent from the pull wire and engaged in a perforation of the lever.

A still further object of the invention is to provide a pruner having non-metallic supporting handle and operating parts which must be handled by the operator in cold weather to prevent chilling hands of the operator due to contact with metallic parts.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a top plan view, with parts broken away of a tree pruner constructed in accordance with the present invention and with the parts shown in initial position.

Figure 2 is a side elevational view of the same with a knife shown in initial position in full lines and in shearing position in dotted lines.

Figure 3 is an enlarged fragmentary top plan view of the pole with a cutting head shown in full lines in the normal central position and in dotted lines in a laterally flexed position.

Figure 4 is a cross-section taken on the line 4—4 in Figure 2.

Figure 5 is a fragmentary perspective view showing the operative parts in the initial position.

Figure 6 is a similar view with the parts in the finally operative position in which the knife has been moved through the hook.

Figure 7 is a perspective view of a form of adjustable bracket employed in the invention.

Figure 8 is a fragmentary side view of said adjustable bracket and,

Figure 9 is a cross-sectional view taken on the line 9—9 in Figure 8.

Referring more particularly to the drawings, 10 designates a tubular pole of metal or the like having at its lower end a wooden hand hold. While I specify wood as the material of this hand hold 11, it may be of other low heat conductivity material so that it may be grasped in cold weather without discomfort.

The pole 10 is provided at its upper end with the usual hook 12 composed of a pair of spaced apart side plates 13 and 14 between which the shear blade 15 moves upon a pivot 16 mounted in such side plates 13, 14. Actuation, or pivotal movement of the blade 15 through the hook 12 is accomplished by a pulling wire 18 having its upper end coupled to the free end of the tail piece 17.

Fitted between the lower ends of the side plates 13 and 14 and secured to such side plates by bolts or other fastenings 20 is a resilient metal insert plate 19 which has an intermediate portion bridging the gap between the lower ends of the hook side plates 13, 14 and the upper bifurcated ends 21, 22 of the tubular pole 10, the lower portion of the resilient plate 19 being accommodated in the slot between the bifurcated ends 21, 22 wherein such lower end is affixed by bolts or other fastenings 23.

As best seen in Figures 2 and 3, the arrangement is such that the intermediate portion of the resilient insert plate 19 is exposed beyond the upper end of the pole and below the lower ends of the hook side plates 13, 14. In other words, this intermediate portion of the resilient insert plate 19 is the sole connection between the pole 10 and the cutting unit which is comprised of the hook 12 and the shear plate 15. The intermediate portion of the resilient insert plate 19 forms a resilient or spring neck which may flex laterally from side to side in its flatwise direction as indicated by the dotted lines in Figure 3 which shows the cutting unit displaced from the central position. Such cutting unit may also be displaced similarly to the other side of the central position shown in full lines at 13, 14. The inherent resiliency of the insert plate 19 will tend to preserve the central position of the unit and will restore the unit to the central position whenever the disturbing force is removed.

The lower end of the pulling wire 18 is directed through an upper slot 24 into the interior of the tubular pole 10 down through which it passes until arriving at a lower slot 25 which is spaced axially of the pole from the upper slot 24. The pulling wire 18 is brought out through the lower slot 25 to the exterior of the pole and is connected with one of a series of perforations 27, 28 made in the intermediate portion of the lever 29. The lower terminal end of the pulling wire 18 is bent or hooked as indicated at 26 after passing through perforation 27.

The lever 29 is fulcrumed at one end upon a bolt or fulcrum 30 carried at the outer free end of an arm 31 which is pivoted upon a bolt or other fulcrum 32 carried by the flange 33 of a bracket 34. Such bracket 34 is adjustably affixed to the pole 10 and carries a stop 35 in position to be engaged in one position by the tail piece 36 of the arm 31.

As shown more particularly in Figure 8, a slot 37 in the bracket 34 receives two or more bolts 38 which pass through or are affixed to the pole 10. By loosening the nuts 39 on the bolts 38, the bracket 34, carrying with it the arm 31 and lever 29, may be shifted back and forth longitudinally of the pole 10 after which adjustment the new position may be preserved by retightening the nuts 39.

As shown more particularly in Figure 7, the flange 33 of the bracket subserves a double function. In the first instance, it furnishes a platform for the support and pivotal movement of the arm 31, the fulcrum bolt 32 of which passes through a perforation 42 in such flange 33. In the second place, the stop 35 is an upturned portion of the flange 33, severed therefrom along the shear line 40, as shown in Figure 7.

The bracket 34 supports a second flange 41 which extends toward and partially overlies the adjacent portion of the pole 10. This portion of the pole may be flattened as indicated at 43. The flattened portion 43 is a continuation of the flat sides of the lower slot 25, which flat sides are indicated at 44. These flat portions 43 and 44 of the tubular pole 10 provide extensive bearing surfaces on which the lever 29 may slide with facility incident to its rocking movement up and down about its fulcrum 30 on the arm 31. The lever 29 may also derive some support from the adjacent surface of the flange 41 of the bracket 34, when the lever descends to the lower position shown in Figure 6. A coil spring 45 biases the lever 29 to the upper position shown in Figures 1 and 5. This spring 45 is anchored at its upper end to the pole as indicated at 46 in Figure 1. At its lower end it is provided with a hook 47 by which it is connected to the lever 29 at an intermediate portion close along side the pole 10.

The pulling wire 18 is flexible but possesses sufficient rigidity so that when the spring 45 rotates the lever 29 to the upper position, the wire 18 will possess sufficient rigidity to comunicate a direct thrust upwardly upon the tail piece 17 of the shear blade 15 to rock that blade to the full line position shown in Figure 2.

An upturned lug 48 on the free end of the arm 31 is positioned to be encountered by the lever 29 as a stop creating an upper limit position of the lever. When the lever 29 encounters this stop 48, if the tail piece 36 has not already closed against the stop 35 then the further upward movement of the lever 29 under the influence of spring 45, will have the effect to rotate the arm 31 about its fulcrum 32 to close tailpiece 36 against stop 35, which position is shown in Figure 5.

The free end of the lever 29 is connected by a pulling wire 49 or the like to a manual operating device which in this instance is comprised of a wooden sleeve 50 slidable upon the pole 10 below the bracket 34. The sleeve 50 may be made of wood or some other material having low heat conductivity. The lower end of the pulling wire 49 may be connected to flanges 51 of a metal or other ring 52 embracing the sleeve 50.

In operation, the coil spring 45 is distended, as shown in Figure 6, when the lever 29 is drawn to the lowered position on the pole 10. The potential energy of the spring 45 at all times biases the lever 29 towards the upper position shown in Figure 5 where the spring 45 is shown substantially in its shut height. In contracting and drawing the lever 29 upwardly about its fulcrum 30, the coil spring first moves the lever 29 against the lug 48 and therefore the contracting movement of the spring 45 is effective to swing the arm 31 about its fulcrum 32 from the position of Figure 6 to the position of Figure 5, where the tail piece 36 is in engagement with the stop 35. This outward swinging movement of the arm 31 around its pivot pin 32 and away from the pole 10 is initiated before the lever 29 strikes the lug 48. As viewed in Figure 6, it will be noted that the lever 29 has an acutely angled relationship with the arm 31 of a low angular value so that upward thrust of the spring 45 upon arm 31 communicated through the lever 29 to the arm 31 by way of the fulcrum pin 30 will tend to push the upper free end of the arm 31, that is the end at the fulcrum 30, away from the pole 10. The point 27 on the lever 29 to which the pulling wire 18 is connected will rotate counterclockwise, as viewed in Figure 6 about the fulcrum point 30 incident to the upward thrust of the spring 45 upon arm 31 and if the fulcrum point 30 is allowed to remain fixed, the arc of movement of the point 27 during the upward movement of the lever 29 will cause this point of connection 27 to move to a substantial distance laterally beyond the lower slot 25 on the side opposite the bracket and arm 31 (the wire 18 being sufficiently flexible to permit this movement) which might tend to result in some binding of the pulling wire 18 although the slot 25 is made of sufficient width to avoid same.

Thus during the upward movement of the lever 29 the thrust developed by the spring 45 will cause the fulcrum 30 to move progressively outward away from the pole 10 thus flattening the arc of movement of the point of connection 27 so that this hook or connection 26 will tend to move in a path more nearly approaching a right line which has obvious mechanical advantages in communicating a straight line thrust to the pulling wire 18, which during the upward movement of the lever 29, operates to rotate the shear blade 15 and its tail piece 17 in a clockwise direction, as viewed in Figure 2, from the dotted line position to the full line position in this figure of these parts.

It will be noted, particularly from a comparison of Figures 1, 5 and 6, that the coil spring 45 is anchored at its upper end at 46 close against the pole 10, and that at its lower end 47, it is connected to an intermediate portion of the lever 29, also close to the pole 10 in all its positions of the lever 29, as shown in Figures 5 and 6. Due to this point of connection 47 of the spring 45 and due to the crosswise disposition of the lever 29 with reference to the pole 10, and due also to the location of the fulcrum 30 on the opposite side of the lever from the application 47 of spring thrust 45, the contracting thrust of the spring 45 will also tend to exert a thrust upon the arm 31 tending to move its outer free end which carries the fulcrum 30 progressively outward away from the pole 10. The final movement of the arm 31 in executing this movement takes place, of course, when the lever 29 approaches the upper limit of its movement and strikes the lug 48 thus closing the tail piece 36 against stop 35.

The spring 45 is thus effective to maintain the shear blade 15 in the initial position. Downward pull upon the sleeve 50 will cause the blade 15 to move toward the hook 12 and actually between the plates 13, 14 on its shearing action. While the movement of the sleeve 50 both up and down is essentially a rectilinear one due to guidance by the straight line pole 10, it is to be noted that the pulling wire 49 is connected to the free end portion of the lever 29 at a point laterally removed a substantial distance from the axis of the tube 10. The pulling wire 49 therefore assumes a diagonal position in its initial position and its effective thrust upon the lever 29 is resolved into two components, one a downward pull upon the lever 29 causing the same to move from the position of Figure 5 to that of Figure 6 in executing a full stroke of the shear knife 15 from the full to the dotted line position of Figure 2. The second component is a thrust of the lever 29 crosswise of the pole 10 in the direction of the arm 31 and bracket 34. This latter component diminishes as the sleeve 50 descends. Meantime, the spring 45 has been greatly distended, particularly in the last stages of the downward movement of the sleeve 50. As the tension of the spring 45 cannot be relieved by movement upwardly of the lever 29 due to connection of lever 29 at 30 to arm 31, the thrust of the pulling wire 49 exerted upon the lever 29 is communicated along the lever 29 and the point of connection 53 of the pulling wire 49 with the free end of the lever 29 becoming a travelling fulcrum for the lever 29, the spring 45 pulling the lever in an upward rocking movement about this fulcrum 53, which movement is permitted owing to the fact that the normal fulcrum 30 of the lever 29 is itself a movable one owing to the fact that it is supported upon a rocking arm 31. The action that takes place is shown in Figure 6, where the upward thrust of the distended spring 45 has rotated the lever 29 about the travelling fulcrum 53 to swing the arm 31 about its pivot point 32 to move the tail piece 36 away from the stop 35. This permits the fulcrum 30 to approach closer to the pole 10 thus tending to maintain the point 26 at all times in alignment with the lower slot 25.

When the lever 29 is in a normal or right angular position across the pole 10, its fulcrum point 30 must be most remote from the axis of the pole 10 if the point of connection 27 is to be maintained in alignment with the slot 25. Also, as the lever 29 swings down toward the position of Figure 6, the fulcrum point 30 must move progressively nearer to the axis of the pole 10 if the point of connection 27 is to be preserved in alignment with the slot 25. This is the purpose of carrying the fulcrum 30 upon the movable arm 31.

It will be appreciated that a tree pruner pursuant to the present invention is a much more efficient orchard tool than conventional pruners. The arrangement described and shown provides for additional leverage over that of any known commercial implements, enabling the cutting of larger branches of the tree with a minimum of effort at the sliding sleeve 50.

The placing of the bracket 34, arm 31 and lever 29 in the manner and relationship shown and described prevents "binding" at the joints, which is a common weakness of pruners at present in use.

The steel neck 19 permits the cutting head of the pruner to bend when the pruner is used in a cramped or prying contact with the branch to be severed.

As shown in Figure 3, when the head is bent laterally, the blade 15 will move with the plates 13, 14. Consequently the blade will strike evenly in the same place at all times so that there is no binding. The knife 15 does not strike the sides 13, 14 of the head and consequently dulling of the blade is prevented.

From Figure 5 it will be apparent that the lever 29, pole 10, bracket 34 and arm 31 are combined in a group which simulates the figure "4." Furthermore, the arrangement of the arm 31 with the lever 29 at the fulcrum 30 produces an "elbow." Due to this relative arrangement, the device has the advantage of a prying lever which increases the leverage on the knife in contact with the cutting of the branch.

The lever 29 is in effect carried by the bracket 34 which is adjustably mounted on the pole through the bolts 38, nuts 39 and the slot 37. This affords opportunity of changing the position of the bracket 34 up or down the pole. It is useful in case the pulling wire is broken. The operator, with little difficulty, can bend a new hook on the pull wire and by loosening the bracket will be able to make the repair with little difficulty and delay. Also, the bracket being adjustable on the pole, admits of an easy attachment of a new pull wire.

The lower part of the pole will ordinarily be made of aluminum or some other metal. Inasmuch as these pruning instruments are used to great extent in winter, operators complain that their hands become cold in the handling of metal poles. The wooden or equivalent handle 11 and sleeve 50 corrects this situation in that the operator's hands do not come into direct contact with the cold metal.

It will be noted, as heretofore stated, that the lever 29 is subject to what might be termed as a "side pull." This "side pull" prevents the lever from striking the operator in the face. The operator is, of course, always intent upon trimming the limbs of the tree and his gaze is aloft. The lever 29 also "lays down" on the pole 10, particularly in the position of Figure 6, which is another advantage as it keeps the lever from catching clothing or bumping the operator under the chin.

The flexible pull wire 18 operates in conjunction with the resilient insert 19 in that the pull wire 18 will be effective in any lateral position of the head due to bending through the resilient insert 19. The pull wires 18 and 49 will be both flexible and resilient and yet will possess sufficient rigidity to transmit thrust to the blade and to the operating lever 29.

Although I have disclosed herein the best form of the invention known to me at this time, I reserve the right to all such modifications and changes as may come within the scope of the following claims.

What is claimed is:

1. A tree pruner comprising a pole, a head comprising a hook having spaced plates, and a knife pivoted between the plates and adapted to move through the hook, a flat resilient insert plate carried at one end by the upper end of the pole and at the other end by the lower portion of the head and having a laterally bendable shank between the head and pole to permit the knife and hook as a unit to be flexed laterally from side to side of the pole, an operating mechanism for the knife carried by said pole, said operating mechanism comprising in part a flexible connection to the knife offset from said flexible shank.

2. A tree pruner comprising a pole having upper and lower slots and a hollow interior between said slots, a laterally flexible and resilient shank carried by the upper end of said pole and extending upwardly therebeyond, a head affixed to said shank in spaced relation above the pole and comprising a hook having spaced plates, and a shearing knife movably mounted between said plates, a flexible connection to the knife extending downwardly through the upper slot and into the interior of the pole to preserve the alignment of the connection during flexing movement of the head at said shank, the lower end of the connection leading from the interior of the pole through said lower slot, and operating means connected to the lower end of said connection for actuating said knife.

References Cited in the file of this patent

UNITED STATES PATENTS

| Re. 21,347 | Goodman | Feb. 13, 1940 |
| 32,827 | Evans | July 16, 1861 |
| 82,868 | Parks | Oct. 6, 1868 |
| 248,522 | Stanley | Oct. 18, 1881 |
| 379,359 | Bosch | Mar. 13, 1888 |
| 1,074,766 | Wylie | Oct. 7, 1913 |
| 1,246,685 | Unruh | Nov. 13, 1917 |
| 1,522,527 | Lynn | Jan. 13, 1925 |
| 2,070,225 | Dickson | Feb. 9, 1937 |
| 2,569,888 | Gustafson | Oct. 2, 1951 |
| 2,664,628 | Porter | Jan. 5, 1954 |